United States Patent

Amano

[11] Patent Number: 5,609,357
[45] Date of Patent: Mar. 11, 1997

[54] MECHANICAL IGNITION SENSOR

[75] Inventor: Hiroatsu Amano, Aichi-ken, Japan

[73] Assignee: Kabushiki Kaisha Tokai-Rika-Denki-Seisakusho, Aichi-ken, Japan

[21] Appl. No.: 426,927

[22] Filed: Apr. 21, 1995

[30] Foreign Application Priority Data

Jun. 21, 1994 [JP] Japan .................................. 6-138643

[51] Int. Cl.⁶ ...................................................... B60R 21/32
[52] U.S. Cl. ................. 280/734; 280/737; 200/61.45 R; 102/274
[58] Field of Search ..................................... 280/734, 737, 280/735, 806; 102/274, 272, 275.4; 200/61.45 R

[56] References Cited

U.S. PATENT DOCUMENTS

| | | | |
|---|---|---|---|
| 4,889,068 | 12/1989 | Tabata et al. | 102/274 |
| 4,955,638 | 9/1990 | Kinoshita et al. | 280/734 X |
| 5,149,134 | 9/1992 | Fohl . | |
| 5,386,774 | 2/1995 | Yamamoto et al. | 280/734 X |
| 5,415,099 | 5/1995 | Kitazawa et al. | 102/274 |

FOREIGN PATENT DOCUMENTS

| | | |
|---|---|---|
| 0417670 | 3/1991 | European Pat. Off. . |
| 0452521 | 10/1991 | European Pat. Off. ............... 280/734 |
| 0456853 | 11/1991 | European Pat. Off. . |
| 0591797 | 4/1994 | European Pat. Off. . |
| 0642958 | 3/1995 | European Pat. Off. . |
| 9401229 | 6/1994 | Germany . |
| 46-5444 | 11/1971 | Japan . |
| 1117949 | 6/1968 | United Kingdom .................... 102/274 |
| 2274575 | 8/1994 | United Kingdom . |

*Primary Examiner*—Christopher P. Ellis
*Attorney, Agent, or Firm*—Sixbey Friedman Leedom & Ferguson; Thomas W. Cole

[57] ABSTRACT

A mechanical ignition sensor is disclosed having a trigger lever engages an ignition pin and holds the ignition pin at a position separated from a detonating member. When an inertial mass is moved, the trigger lever moves in a direction of separating from the ignition pin so as to allow movement of the ignition pin. A safety device is movable from a position at which the safety device abuts the inertial mass so as to prevent movement of the inertial mass, to a position at which the safety device and the inertial mass are in a state of non-abutment so as to allow movement of the inertial mass. Since movement of the inertial mass is prevented by the safety device, the trigger lever does not move and the mechanical ignition sensor does not operate at the same time that the safety device is released. Thus, the operation of the sensor can be prevented when the safety device is released.

20 Claims, 7 Drawing Sheets

MECHANICAL IGNITION SENSOR

BACKGROUND OF THE INVENTION

1. Field of the Invention

The present invention relates to a mechanical ignition sensor for sensing a state of a sudden deceleration of a vehicle and for operating a detonating member.

2. Description of the Related Art

At an air bag apparatus mounted to a vehicle, for example, a gas generator having a mechanical ignition sensor is disposed. When the vehicle suddenly decelerates, the sudden deceleration is detected by the mechanical ignition sensor and then the gas generator operates. Gas is generated instantaneously so that the air bag body within the air bag apparatus is unfolded within the vehicle.

The mechanical ignition sensor used in the air bag apparatus basically comprises an ignition pin which ignites a detonator, an inertial mass which is inertially moved by a large acceleration, and a trigger member which is interposed between the ignition pin and the inertial mass so as to prevent the ignition pin from moving. Further, the air bag apparatus comprises a safety device for preventing the operation of the mechanical ignition sensor when the sensor is assembled to the vehicle or the like.

The safety device includes a safety lever, which engages the trigger member and prevents the movement of the trigger member regardless of the movement of the inertial mass. When the safety lever engages the trigger member, movement of the trigger member is forcibly prevented as described above. Accordingly, even if external force is unnecessarily applied to the vehicle when the safety lever is assembled thereto, operation of the sensor is prevented.

In the conventional mechanical ignition sensor having the aforementioned structure, movement of the trigger member is forcibly prevented by the safety lever. However, the inertial mass itself is movable in the operating direction of the inertial force. Consequently, when the safety lever is released (i.e., when the inertial mass is movable), in a case in which the inertial mass is located at a position at which the trigger member is moved, a drawback arises in that the trigger member moves and the mechanical ignition sensor operates at the same time that the safety lever is released.

SUMMARY OF THE INVENTION

With the aforementioned in view, an object of the present invention is to provide a mechanical ignition sensor which can prevent operation of the sensor when a safety device is released.

A first aspect of the present invention is a mechanical ignition sensor, comprising: an ignition pin which moves in an axial direction of the ignition pin so as to ignite a detonating member; an inertial mass which is moved by an inertial force when a predetermined amount of load acts on the inertial mass; a trigger lever which engages the ignition pin and holds the ignition pin at a position separated from the detonating member, and when the inertial mass is moved, the trigger lever moves in a direction of separating from the ignition pin so as to allow movement of the ignition pin; and a safety device which is movable from a position at which the safety device abuts the inertial mass so as to prevent movement of the inertial mass, to a position at which the safety device and the inertial mass are in a state of non-abutment so as to allow movement of the inertial mass.

A second aspect of the present invention is a mechanical ignition sensor according to the above-described first aspect of the present invention, wherein the safety device has a stopper, and the stopper moves into a movable region of the inertial mass so as to abut the inertial mass, and the stopper moves out of the movable region of the inertial mass so as to enter a state of non-abutment with the inertial mass.

In accordance with the first aspect of the present invention, the ignition pin is normally located at a position separated from the detonating member, and the inertial mass is located on the locus of rotation of the trigger lever. Further, the engaging portion of the trigger lever engages and holds the ignition pin, and the rotation of the trigger lever is prevented by the inertial mass. The holding of the ignition pin is thereby maintained.

Here, in a state in which the safety device operates (the state in which the sensor is inoperative), the safety device abuts the inertial mass so as to prevent movement of the inertial mass. Therefore, in this state, even if a large acceleration acts on the mechanical ignition sensor, the inertial mass does not move inertially and the holding of the ignition pin is not released.

On the other hand, when the safety device is released, the safety device does not abut the inertial mass and the inertial mass is movable. Accordingly, the safety device does not operate (the sensor becomes operative).

When a large acceleration acts on the mechanical ignition sensor in this state, the inertial mass moves inertially. Consequently, the holding of the trigger lever by the inertial mass is released, and the trigger lever is pivoted in a direction of moving away from the ignition pin. The holding of the ignition pin by the engaging portion of the trigger lever is thereby released. The ignition pin is moved in the axial direction thereof so as to ignite the detonating member.

In the mechanical ignition sensor of the first aspect of the present invention, the movement of the inertial mass is prevented by the safety device. Thus, when the safety device is released, the inertial mass is not located at a position at which the trigger lever is moved. Therefore, a superior effect is achieved in that operation of the sensor can be prevented when the safety device is released, without the trigger lever moving and the mechanical ignition sensor operating at the same time that the safety device is released.

In accordance with the second aspect of the present invention, in the state in which the safety device operates (the state in which the sensor is inoperative), the stopper moves into the movable region of the inertial mass and abuts the inertial mass. The movement of the inertial mass is thereby prevented. On the other hand, when the stopper moves out of the movable region of the inertial mass, the stopper does not abut the inertial mass and the inertial mass becomes movable. As a result, the safety device does not operate (the sensor becomes operative).

In the mechanical ignition sensor of the second aspect of the present invention, by moving the stopper of the safety device out of the movable region of the inertial mass, the operating state of the safety device can be switched to the released state thereof. In addition to the above-mentioned effect, a superior effect is achieved in that the release operation of the safety device is easy.

DESCRIPTION OF THE PREFERRED EMBODIMENTS

FIGS. 1 through 6 illustrate a mechanical ignition sensor relating to an embodiment of the present invention.

Figure 1:
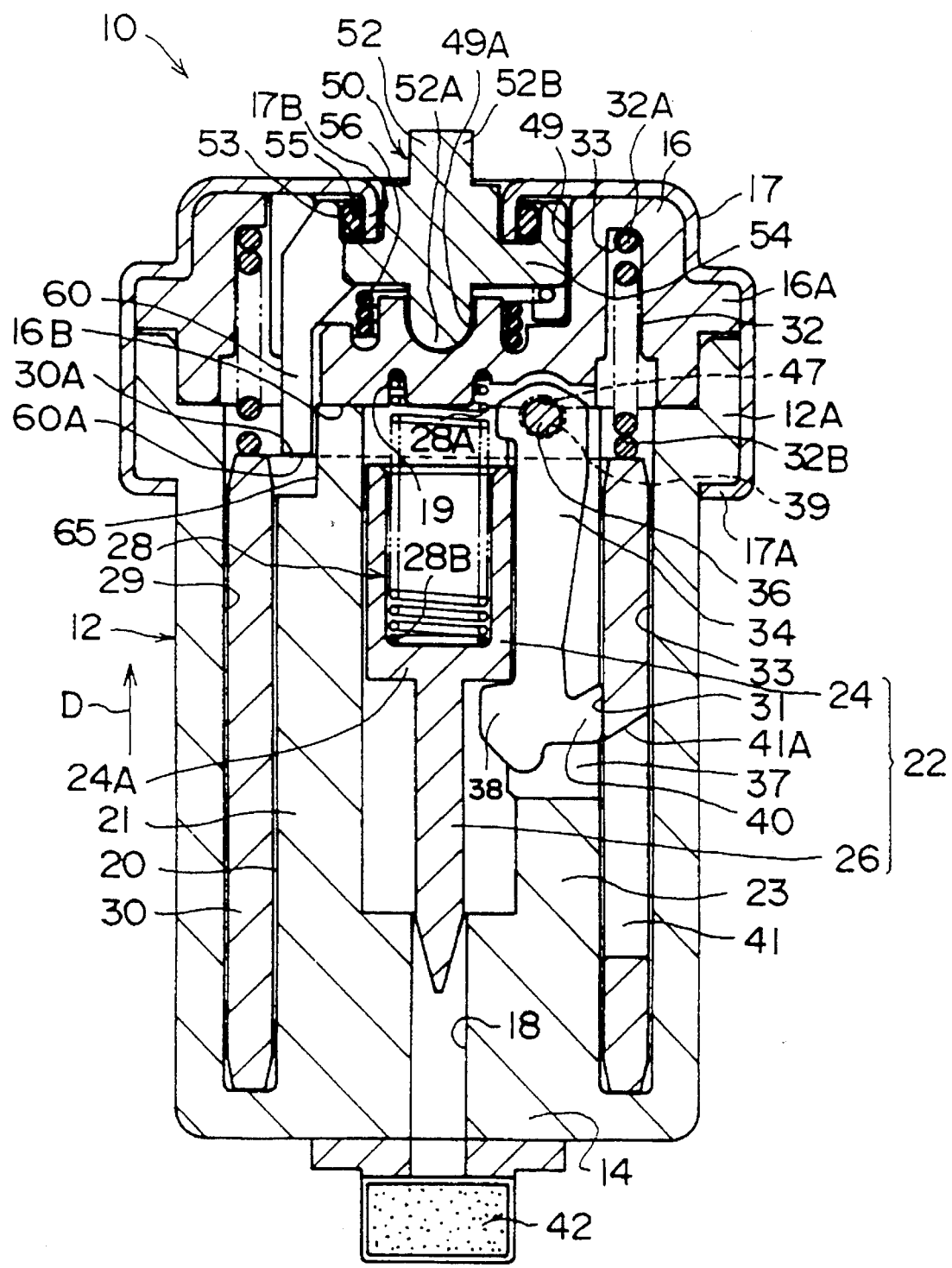
FIG. 1 is a side sectional view which shows an operating state of a safety device of a mechanical ignition sensor relating to an embodiment of the present invention.

As illustrated in FIG. 1, a mechanical ignition sensor 10 includes a case 12. The case is shaped in a cylindrical form and has a bottom wall 14 at one end thereof.

Figure 3:
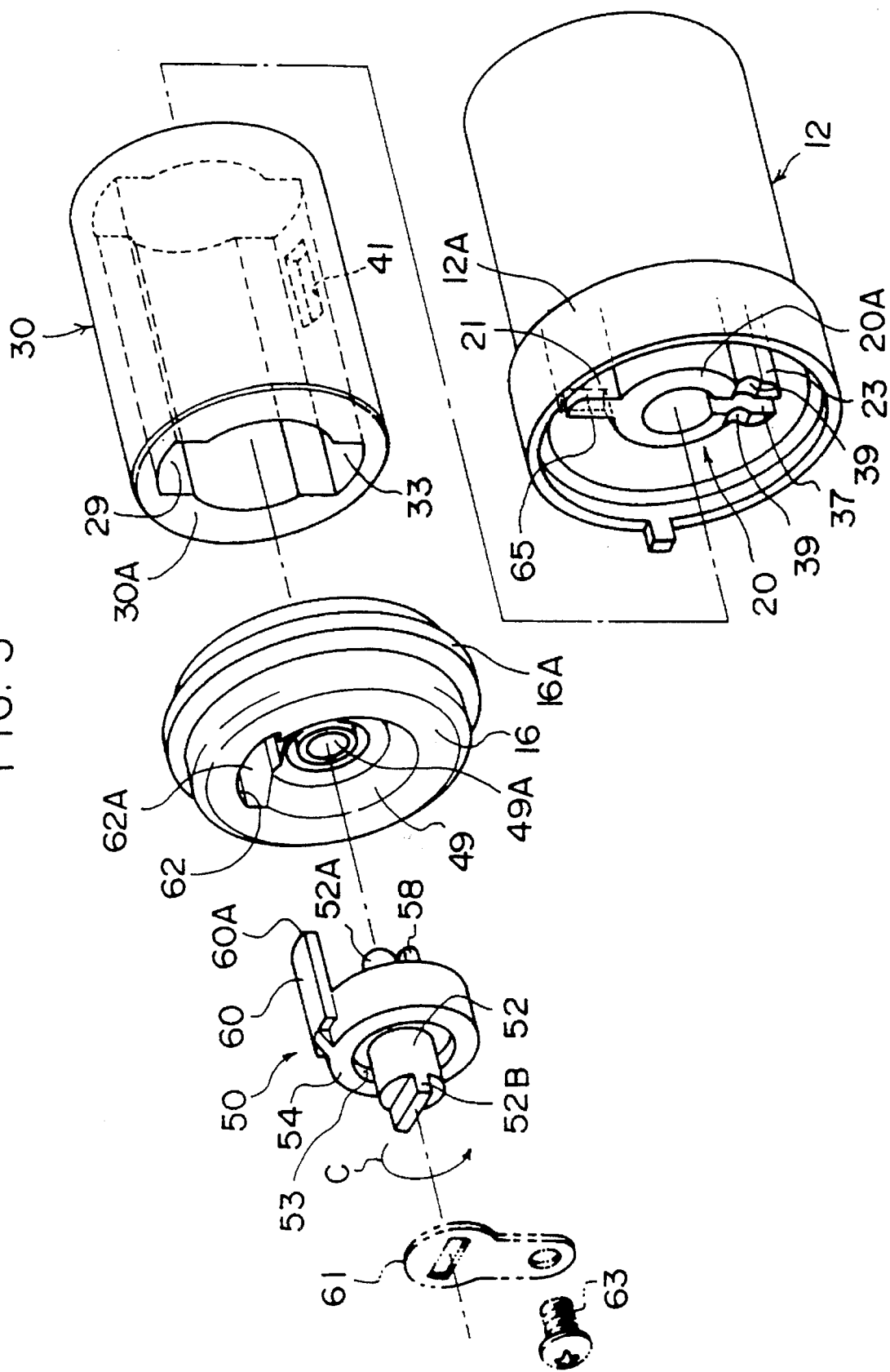
FIG. 3 is an exploded perspective view which shows main portions of the mechanical ignition sensor relating to the embodiment of the present invention.

As shown in FIG. 3, at the open edge portion of the case 12, a ring-shaped convex portion 12A is formed integrally with the case 12 and is directed outwardly in the radial direction thereof. As illustrated in FIG. 1, the open side of the case 12 is closed by a substantially columnar bobbin 16. A ring-shaped convex portion 16A is formed at the outer circumferential portion of the bobbin 16 and is directed outwardly in the radial direction thereof. The convex portion 16A abuts the convex portion 12A of the case 12.

As shown in FIG. 1, a cap 17 covers the bobbin 16 and the convex portion 12A of the case 12. By caulking an edge portion 17A of the cap 17 to the convex portion 12A of the case 12, the bobbin 18 is fixed to the case 12.

At the bottom wall 14 of the case 12, a through-hole 18 is formed along the central axis of the case 12. In addition, a substantially cylindrical guide 20 having a pair of convex portions 21, 23, which project in the radial direction of the guide 20, is formed coaxially with the case 12 at the bottom wall 14 and projects toward the open edge portion of the case 12.

An ignition pin 22 is disposed within the case 12. The ignition pin 22 is composed of a main body 24 which is shaped in substantially cylindrical form and a needle-shaped convex portion 26 which is integrally formed with and projects from a bottom wall 24A of the main body 24. The outer diameter of the main body 24 is inserted into the guide 20, and the ignition pin 22 slidably moves within the guide 20 along the axial line thereof.

In a state in which the ignition pin 22 (the main body 24) has moved as far as possible toward the bottom wall 14 of the case 12, the convex portion 26 projects from the through-hole 18 formed at the bottom wall 14 to the exterior.

A firing spring 28, which is made of a coil spring, is disposed between the bobbin 16 and the ignition pin 22. The firing spring 28 always urges the ignition pin 22 in the direction of the through-hole 18. One end portion 28A of the firing spring 28 is inserted into a ring-shaped concave portion 19 which is formed at a bottom surface 16B of the bobbin 16, and the other end portion 28B of the firing spring 28 is inserted into the main body 24 of the ignition pin 22. An inertial mass 30 is disposed at the outer circumference of the guide 20.

As shown in FIG. 3, the inertial mass 30 is formed in a substantially cylindrical shape. Concave portions 29, 33, into which the convex portions 21, 23 of the guide 20 are inserted, are provided in the inertial mass 30 along the axial direction of the guide 20. The inertial mass 30 is accommodated between the circumferential wall of the case 12 and the guide 20 so as to be movable in the axial direction of the guide 20.

As shown in FIG. 1, a bias spring 32 is disposed between the inertial mass 30 and the bobbin 16 and always urges the inertial mass 30 in the direction of the bottom wall 14. The movement of the inertial mass 30 is restricted until a predetermined amount of load acts on the bias spring 32. One end portion 32A of the bias spring 32 is inserted into the ring-shaped concave portion 33 which is formed at the bottom surface 16B of the bobbin 16, and the other end portion 32B of the bias spring 32 abuts an end surface 30A of the inertial mass 30.

A trigger lever 34 is disposed between the inertial mass 30 and the ignition pin 22. The trigger lever 34 is inserted into a slit 37, which is formed at the convex portion 23 of the guide 20 along the axial direction thereof. In addition, one end portion of the trigger lever 34 in the longitudinal direction thereof is supported by a shaft 36 so as to be pivotable. As shown in FIG. 3, at the end surface 20A of the guide 20, the shaft 36 engages a pair of concave portions 39 which have semi-circular cross-sectional configurations and which are formed such that the slit 37 is located therebetween.

As illustrated in FIG. 1, a pair of concave portions 47, which oppose the pair of concave portions 39, are formed at the bottom surface 16B of the bobbin 16. The concave portions 39 and 47 form a bearing portion for the shaft 36.

Moreover, an engaging portion 38, which projects toward the ignition pin 22, is formed at the other end portion of the trigger lever 34 (i.e., the end portion of the trigger lever 34 not supported by the shaft 36). The engaging portion 38 is engageable with the main body 24 of the ignition pin 22. Because the engaging portion 38 of the trigger lever 34 has an inclined surface, the engaging portion 38 is urged by the urging force of the firing spring 28 via the main body 24 of the ignition pin 22 in the direction of moving away from the ignition pin 22. Namely, by rotating the trigger lever 34 around the shaft 36, the engaging portion 38 can move toward or away from the ignition pin 22. In a state in which the engaging portion 38 of the trigger lever 34 has engaged the main body 24 of the ignition pin 22, the tip end portion of the convex portion 26 of the ignition pin 22, which is urged by the firing spring 28, is held at a position in a vicinity of the entrance to the through-hole 18.

An abutting portion 40 is formed at the trigger lever 34 at the opposite side of the engaging portion 38 (i.e., towards the outer circumferential side of the case 12), and projects toward the inertial mass 30. The abutting portion 40 corresponds to a slide portion 31, which is formed at the inner circumference of the inertial mass 30, and is structured so as to contact the slide portion 31. Namely, the inertial mass 30 is normally positioned by the bias spring 32 so as be as close as possible to the bottom wall 14 of the case 12. In this state, the slide portion 31 of the inertial mass 30 abuts the abutting portion 40 of the trigger lever 34, the engaging portion 38 of the trigger lever 34 engages the main body 24 of the ignition pin 22, and the tip end portion of the convex portion 26 of the ignition pin 22 is held at a position in a vicinity of the entrance to the through-hole 18.

Further, when the inertial mass 30 moves in the direction of moving away from the bottom wall 14, the slide portion 31 of the inertial mass 30 moves relative to the abutting portion 40 of the trigger lever 34 while linearly contacting the abutting portion 40.

A slit 41, into which the abutting portion 40 of the trigger lever 34 can enter, is formed at the bottom wall 14 side of the slide portion 31 of the inertial mass 30 along the axial direction thereof.

Figure 4:
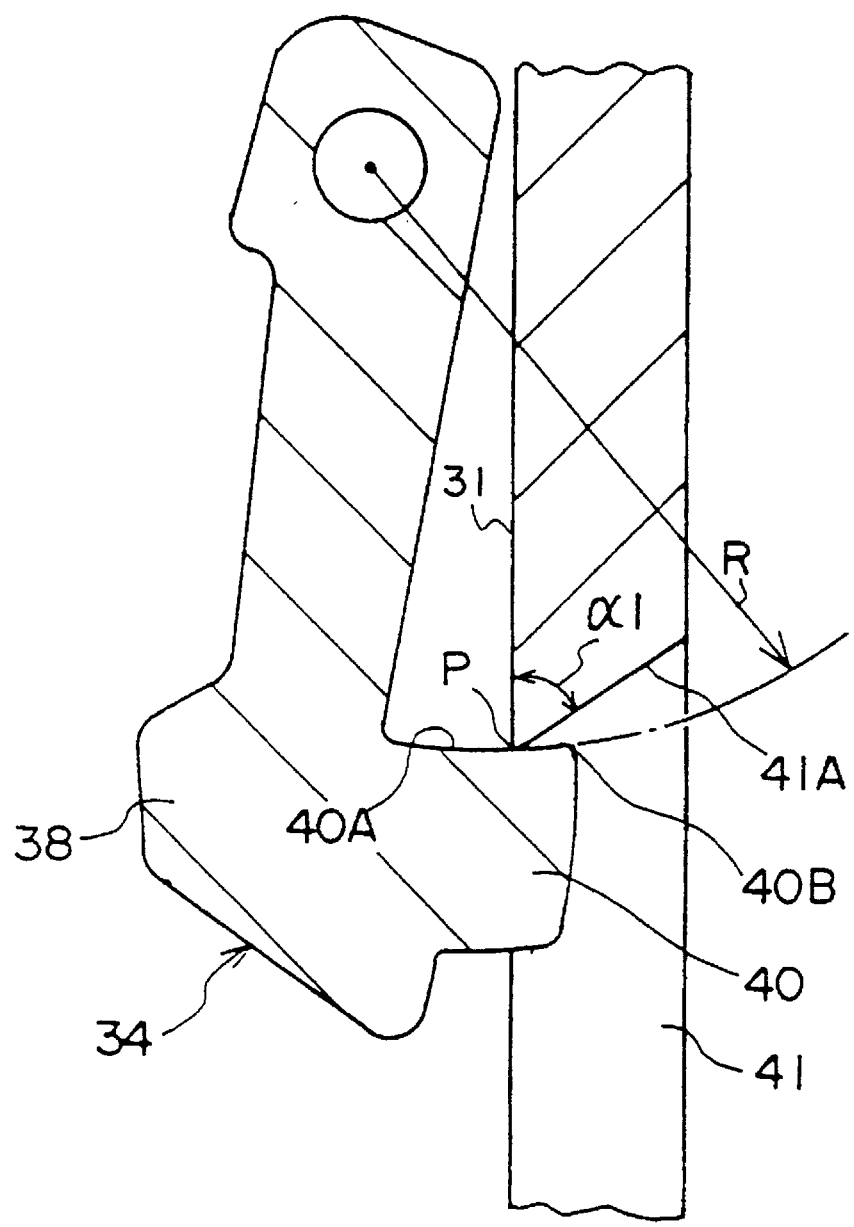
FIG. 4 is a side sectional view which shows a trigger lever of the mechanical ignition sensor relating to the embodiment of the present invention.

As illustrated in FIG. 4, the inner circumferential surface of the slit 41 at the bias spring 32 side is an inclined surface 41A. The inclined surface 41A is provided such that the length of the slit 41 increases towards the outer circumferential of inertial mass 30. An inclined surface 40A of the abutting portion 40 is a curved surface, which is substantially along a locus of rotation (radius R) of an end portion 40B of the abutting portion 40. An angle α 1, which is defined by the slide portion 31 of the inertial mass 30 and the inclined surface 41A, is narrow enough to only allow a vertex P of the angle α 1 to abut the inclined surface 40A. Namely, the inclined surface 40A linearly contacts the vertex P. Therefore, the slide resistance between the inclined surfaces 40A and 41A can be made small.

As illustrated in FIGS. 1 and 3, a circular concave portion 49 is formed in a central portion of the bobbin 16 along the axial direction thereof. A safety device 50 is inserted into the concave portion 49. The safety device 50 is formed so as to be substantially shaped as a peg top. A tip end portion 52A of a shaft portion 52 of the safety device 50 is rotatably inserted into a bearing portion 49A which is formed in the central portion of the concave portion 49.

As shown in FIG. 1, a coil spring 56 is disposed between a collar portion 54 of the safety device 50 and the bottom surface of the concave portion 49. In the safety device 50, a ring-shaped concave portion 53 is formed at the outer circumferential portion of the shaft portion 52. The edge portion 17B of the cap 17 is inserted into the concave portion 53. A seal ring 55 is inserted between the edge portion 17B of the cap 17 and the concave portion 53.

Figure 2:
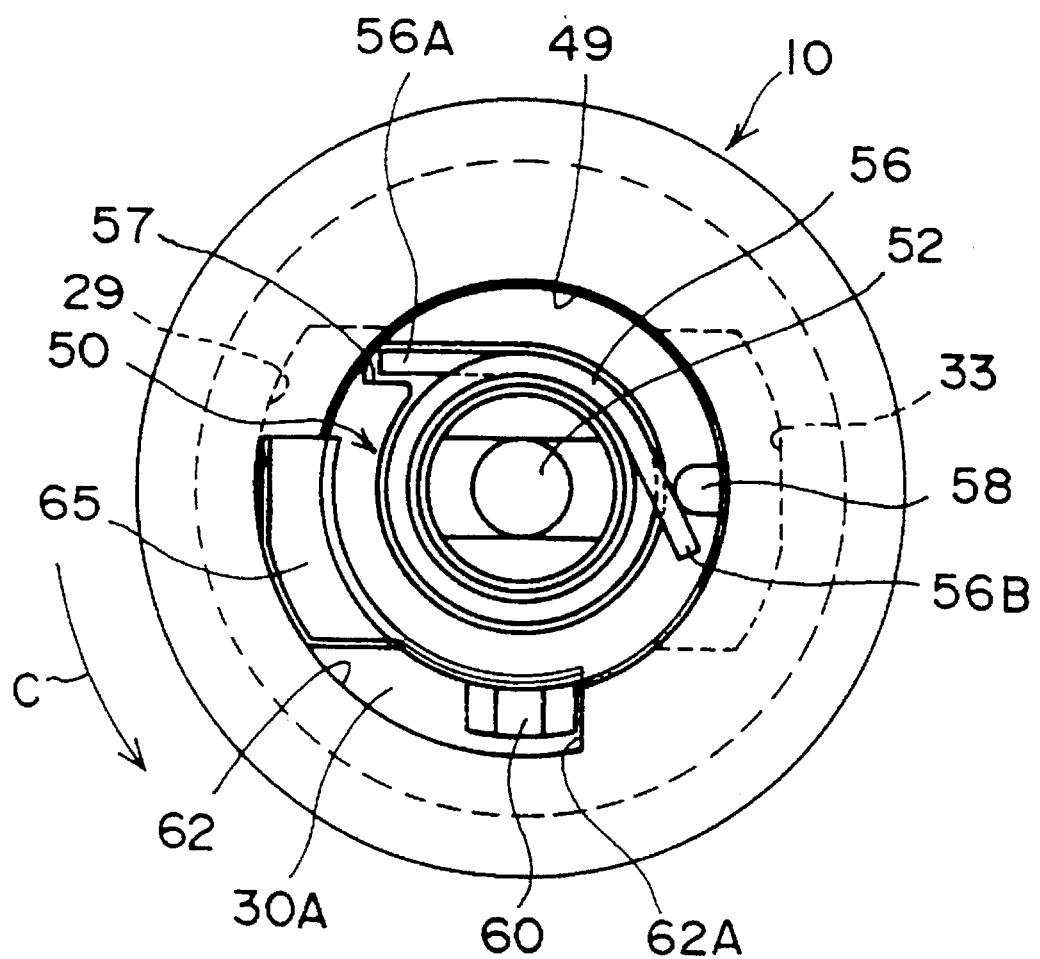
FIG. 2 is a schematic plan view which shows the operating state of the safety device of the mechanical ignition sensor relating to the embodiment of the present invention.

As illustrated in FIG. 2, one end portion 56A of the coil spring 56 is inserted into a concave portion 57 which is formed at the bottom surface of the concave portion 49. The other end portion 56B of the coil spring 56 engages a convex portion 58 which is formed at the under surface of the collar portion 54 of the safety device 50. The coil spring 56 urges the safety device 50 in the counterclockwise direction in FIG. 2 (the direction of arrow C in FIG. 2).

As illustrated in FIGS. 1 and 3, a stopper 60 is formed at the outer circumferential portion of the collar portion 54 of the safety device 50. The stopper 60 is formed so as to be substantially parallel to the shaft portion 52. The stopper 60 passes through a through-hole 62, which is formed in the bobbin 16, and then reaches the interior of a cut-out portion 65 provided at the convex portion 21 of the guide 20. The cut-out portion 65 opposes the through-hole 62 and extends along the outer circumference of the guide 20. Accordingly, by the urging force of the coil spring 56, the stopper 60 is rotated within the cut-out portion 65 in the direction of arrow C integrally with the safety device 50. Further, in a state in which rotation of the stopper 60 is stopped at an end surface 62A of the through-hole 62, a tip end surface 60A of the stopper 60 opposes the end surface 30A of the inertial mass 30. In this state, the inertial mass 30 can hardly move in the direction of the bobbin 16 (the direction of arrow D in FIG. 1).

On the other hand, a projecting side end portion of the shaft portion 52 of the safety device 50, which side end portion is at the side opposite the tip end portion 52A in the axial direction of the shaft portion 52, is a holding portion 52B. The holding portion 52B is rotated by a holding means, for example, an operation handle 61 shown in FIG. 3 or the like, in the direction opposite the direction of arrow C. The stopper 60 then moves to a position where the stopper 60 can enter the cut-out portion 65 of the convex portion 21, i.e., the concave portion 29. After the operation handle 61 is secured to, for example, the bobbin 16 by a screw 63 or the like, the safety device 50 can be released.

The mechanical ignition sensor 10 having the above structure is assembled to, for example, a gas generator (unillustrated) of an air bag apparatus. A gas-generating agent is accommodated within the gas generator, and further, as illustrated in FIG. 1, a detonator 42 is disposed at the gas generator so as to serve as a detonating member which ignites and combusts the gas-generating agent. In a state in which the mechanical ignition sensor 10 is assembled to the gas generator, the detonator 42 is located on the axial line of the mechanical ignition sensor 10. Accordingly, in the assembled state, the through-hole 18 of the case 12 opposes the detonator 42 so that the convex portion 26 of the ignition pin 22, which can project from the through-hole 18, can strike the detonator 42.

Next, the operation of the present embodiment will be explained.

As illustrated in FIG. 1, in the mechanical ignition sensor 10 of the present embodiment structured as described above, the ignition pin 22 is normally disposed at a position separated from the detonator 42 against the urging force of the firing spring 28. The engaging portion 38 of the trigger lever 34 engages the main body 24 of the ignition pin 22, thereby holding the ignition pin 22 at a predetermined position within the case 12. Further, due to the bias spring 32, the inertial mass 30 is positioned at the position nearest the bottom wall 14, i.e., is located on the locus of rotation of the trigger lever 34. The slide portion 31 abuts the abutting portion 40 so as to prevent the rotation of the trigger lever 34. The holding of the ignition pin 22 is thereby maintained.

Further, as illustrated in FIG. 2, in a state in which the safety device 50 operates (the state in which the sensor is inoperative), due to the urging force of the coil spring 56, the stopper 60 is rotated within the through-hole 62 of the bobbin 16 in the direction of arrow C integrally with the safety device 50. The rotation of the stopper 60 is then stopped at the end surface 62A of the through-hole 62. At this time, the tip end surface 60A of the stopper 60 of the safety device 50 opposes the end surface 30A of the inertial mass 30 so that the inertial mass 30 can hardly move in the direction of the bobbin 16 (the direction of arrow D in FIG. 1).

Consequently, in this state, the holding of the ignition pin 22 is not released even if a large acceleration acts on the mechanical ignition sensor 10, because the inertial mass 30 hardly moves inertially and the trigger lever 34 is not rotated.

Figure 5:
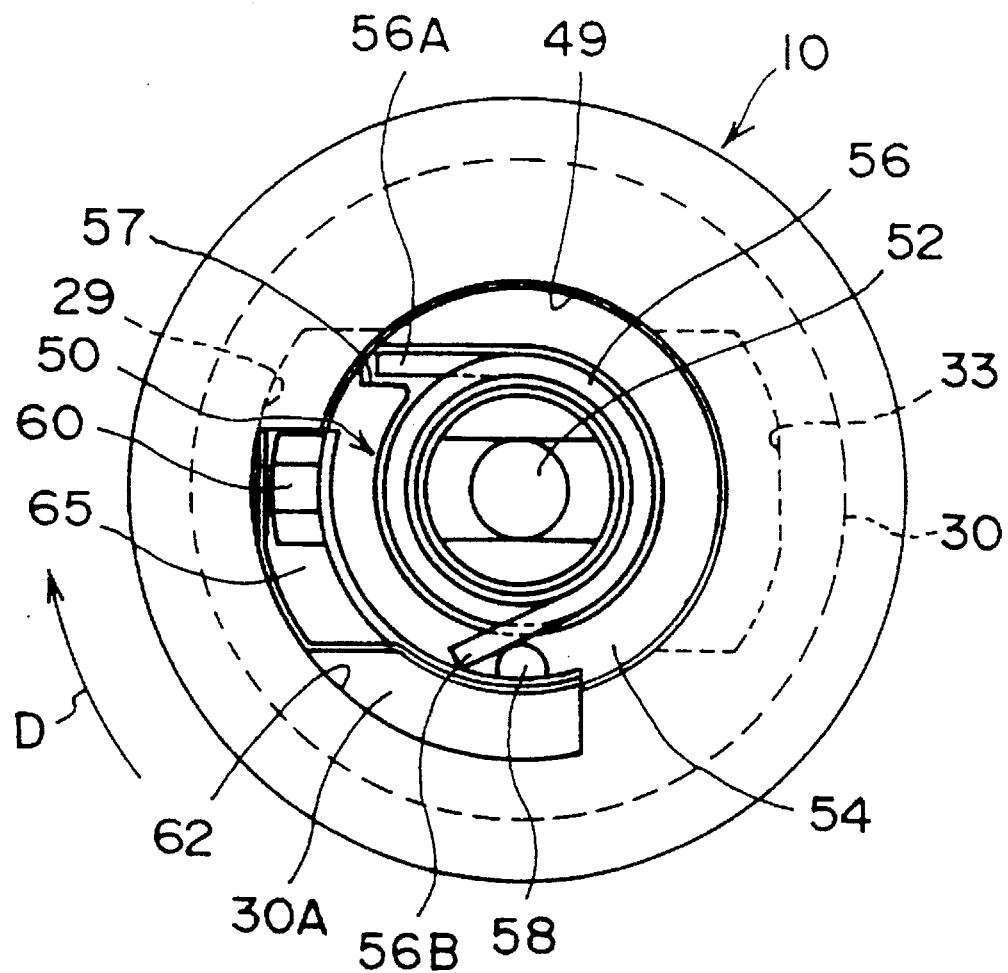
FIG. 5 is a schematic plan view which shows a released state of the safety device of the mechanical ignition sensor relating to the embodiment of the present invention.

On the other hand, the safety device 50 can be released in the following manner. As shown in FIG. 5, the holding portion 52B of the safety device 50 is held by the holding means such as the operation handle 61 (see FIG. 3) or the like, and is rotated in the direction of arrow D in FIG. 5. The stopper 60 is then moved into the cut-out portion 65 of the convex portion 21 of the guide 20, and thereafter, the operation handle 61 is secured.

Figure 6:
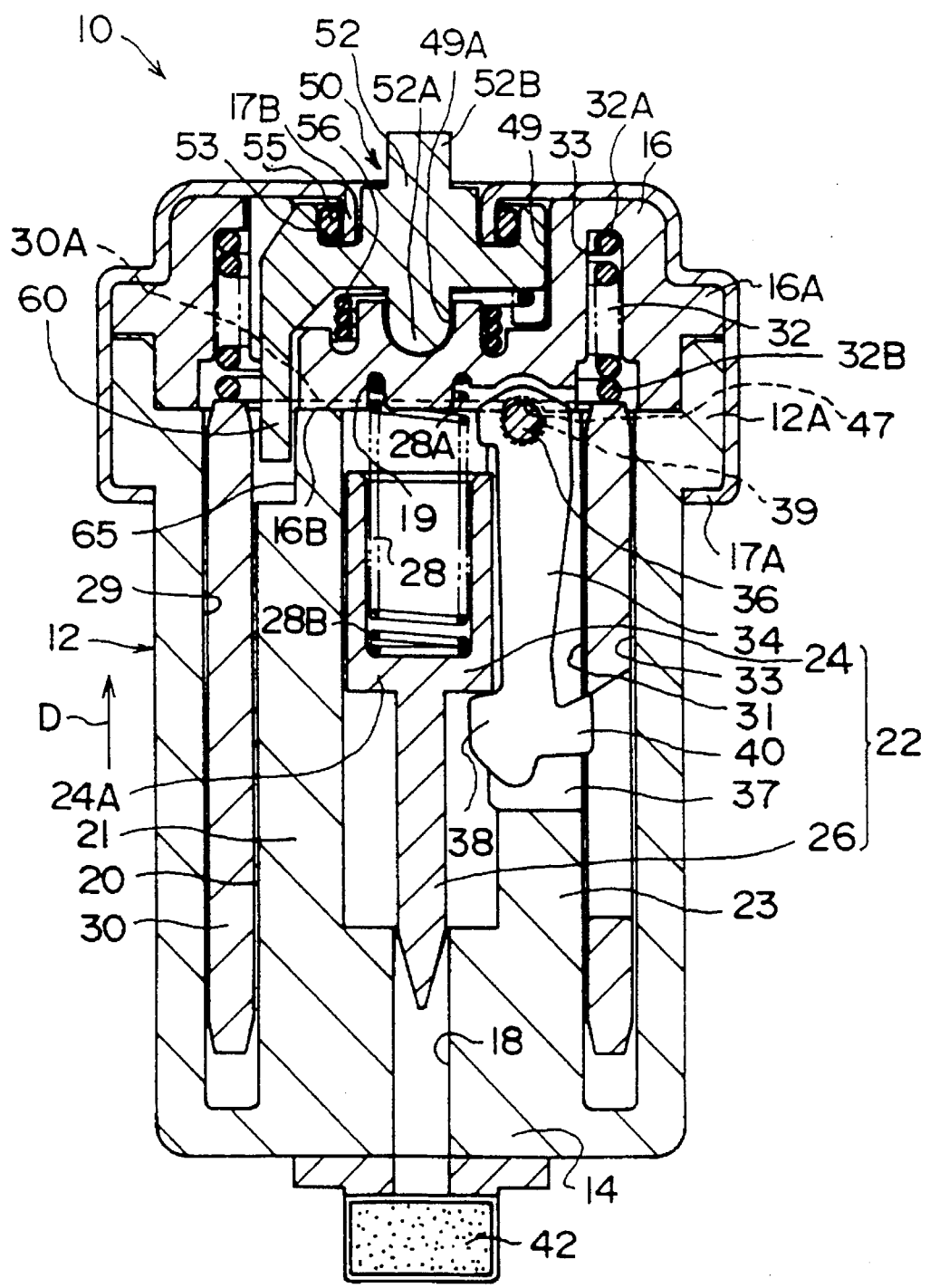
FIG. 6 is a side sectional view which shows the released state of the safety device of the mechanical ignition sensor relating to the embodiment of the present invention.

As illustrated in FIG. 6, when the safety device 50 is released, there is no stopper 60 on the locus of movement of the inertial mass 30. Accordingly, the inertial mass 30 can move in the direction of the bobbin 16 (the direction of arrow D in FIG. 6) and the safety device 50 does not operate (the sensor is operative).

Here, when a large acceleration acts on the mechanical ignition sensor 10, the inertial mass 30 inertially moves in the direction of arrow D in FIG. 6.

In this case, the inertial mass 30 (the slide portion 31) moves while contacting the abutting portion 40 of the trigger lever 34. The abutting portion 40 of the trigger lever 34 is separated from the slide portion 31 of the inertial mass 30 and enters the slit 41 of the inertial mass 30.

Figure 7:
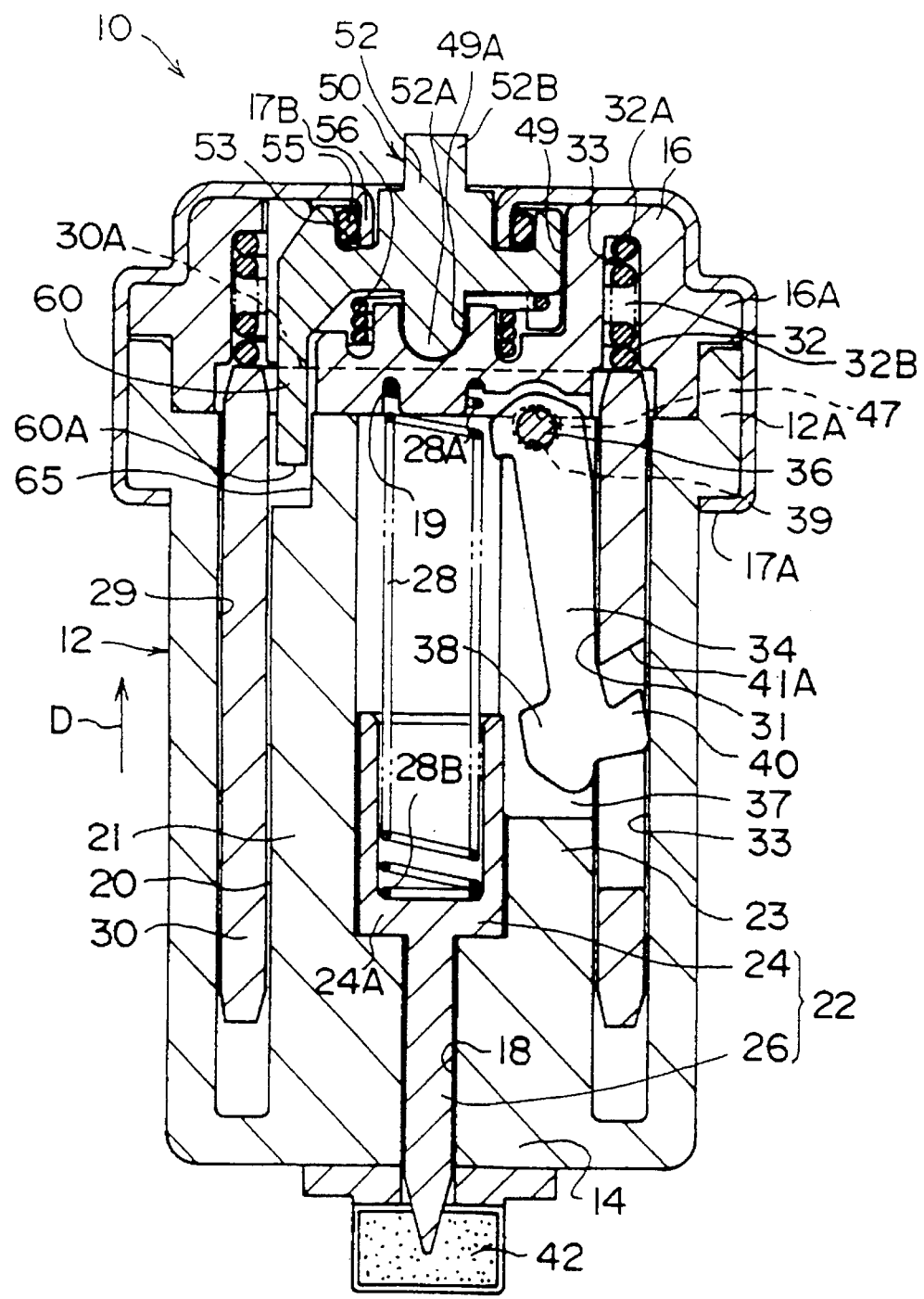
FIG. 7 is a side sectional view which shows a state after operation of the mechanical ignition sensor relating to the embodiment of the present invention.

The trigger lever 34, which is pressed in the direction of separating from the ignition pin 22 by the ignition pin 22 which is urged by the firing spring 28, is pivoted. Accordingly, the engaging portion 38 of the trigger lever 34 is separated from the main body 24 of the ignition pin 22 so as to release the holding of the ignition pin 22. As a result, the ignition pin 22 moves in the axial direction thereof by the urging force of the firing spring 28, and the convex portion 26 projects outwardly from the through-hole 18 (the state shown in FIG. 7).

The convex portion 26 of the ignition pin 22 thereby strikes and ignites the detonator 42. When the detonator 42 is ignited, the gas-generating agent in the gas generator is ignited and combusted, thereby activating an air bag apparatus, for example.

Further, in the mechanical ignition sensor 10 relating to the present embodiment, the movement of the inertial mass 30 is prevented by the safety device 50. In other words, the present invention is not a structure in which the rotation of the trigger lever 34 is prevented by the safety device 50. Accordingly, when the safety device 50 is released, the inertial mass 30 is not moved to a position where the trigger lever 34 is pivoted. Therefore, the trigger lever 34 does not rotate and the mechanical ignition sensor 10 does not operate at the same time that the safety device 50 is released. Moreover, the operation of the mechanical ignition sensor 10 can be prevented when the safety device 50 is released.

In the mechanical ignition sensor 10 of the above-described embodiment, the safety device 50, which prevents movement of the inertial mass 30, is formed so as to be substantially shaped as a peg top and has the stopper 60 at the outer circumferential portion of the collar portion 54. Further, the safety device 50 is rotatable around its axial line. However, the structure of the safety device 50 is not limited to the same. If the safety device can move from the position, at which the safety device engages the inertial mass so as to prevent the movement of the inertial mass, to the position, at which the safety device is not engaged with the inertial mass and allows movement of the inertial mass, a shaft member such as a pin or the like may be used as the safety device so as to be moved into the locus of movement of the inertial mass.

In the mechanical ignition sensor 10 of the above-described embodiment, the ignition pin 22 is held by one trigger lever 34. However, the number of trigger levers 34 is not limited to the same, and there may be two or more trigger levers.

In the above-described embodiment, the firing spring 28 is used as the urging means of the ignition pin. However, the urging means of the ignition pin is not limited to the same, and other urging means which use fluid pressure, liquid pressure or the like may be employed.

In the above-described embodiment, although the bias spring 32 is used as the stopper for the inertial mass, the stopper for the inertial mass is not limited to the same. Other stoppers such as a shear pin or the like, which break at a predetermined amount of load, may be used.

Further, the mechanical ignition sensor 10 of the above-described embodiment is used for a gas generator of an air bag apparatus. However, the present invention is not limited to the same, and can be applied to other devices such as a pretensioner or the like which are activated by being struck by the ignition pin 22.

What is claimed is:

1. A mechanical ignition sensor, comprising:
   an ignition pin which moves in an axial direction of said ignition pin so as to ignite a detonating member;
   an inertial mass which is moved by an inertial force when a predetermined amount of load acts on said inertial mass;
   a trigger lever which engages said ignition pin and holds said ignition pin at a position separated from the detonating member, and when said inertial mass is moved, said trigger lever moves in a direction of separating from said ignition pin so as to allow movement of said ignition pin; and
   a safety device which is movable from a position at which said safety device abuts said inertial mass so as to prevent movement of said inertial mass, to a position at which said safety device and said inertial mass are in a state of non-abutment so as to allow movement of said inertial mass.

2. A mechanical ignition sensor according to claim 1, wherein said safety device has a stopper, and said stopper moves into a movable region of said inertial mass so as to abut said inertial mass, and said stopper moves out of the movable region of said inertial mass so as to enter a state of non-abutment with said inertial mass.

3. A mechanical ignition sensor according to claim 1, wherein said inertial mass has a slit, and said slit is provided so that, when said inertial mass is moved, said trigger lever is movable within said slit.

4. A mechanical ignition sensor according to claim 3, wherein said inertial mass has an inclined surface which opposes said slit, and said inclined surface is inclined so that, when said trigger lever moves within said slit, said trigger lever is prevented from abutting said inclined surface.

5. A mechanical ignition sensor according to claim 1, wherein said trigger lever has an abutting portion, and when said trigger lever engages said ignition pin, said abutting portion abuts said inertial mass.

6. A mechanical ignition sensor according to claim 1, wherein said trigger lever has a shaft portion, and said shaft portion is provided so that said trigger lever is pivotable.

7. A mechanical ignition sensor according to claim 1, further comprising:
   a case which holds said inertial mass, said ignition pin and said trigger lever such that said inertial mass, said ignition pin and said trigger lever are movable.

8. A mechanical ignition sensor according to claim 7, further comprising:
   a bobbin which is provided so as to abut said case, said bobbin holding said inertial mass, said trigger lever and said safety device such that said inertial mass, said trigger lever and said safety device are movable.

9. A mechanical ignition sensor according to claim 1, further comprising:
   an ignition pin urging member which urges said ignition pin in a direction of approaching the detonating member.

10. A mechanical ignition sensor according to claim 1, further comprising:

an inertial mass movement restricting member which restricts movement of said inertial mass until the predetermined amount of load acts on said inertial mass.

11. A mechanical ignition sensor according to claim 8, further comprising:

a cap which is provided so as to contact respective outer circumferential surfaces of said case and said bobbin, said cap securing said bobbin to said case.

12. A mechanical ignition sensor, comprising:

an ignition pin which moves in an axial direction of said ignition pin so as to ignite a detonating member;

an inertial mass which is moved by an inertial force when a predetermined amount of load acts on said inertial mass;

a trigger lever which has a shaft portion at one end portion, another end portion of said trigger lever engaging said ignition pin and holding said ignition pin at a position separated from the detonating member, and when said inertial mass is moved, said trigger lever pivots around said shaft portion and said another end portion of said trigger lever moves in a direction of separating from said ignition pin so as to allow movement of said ignition pin;

a safety device which is movable from a position at which said safety device abuts said inertial mass so as to prevent movement of said inertial mass, to a position at which said safety device and said inertial mass are in a state of non-abutment so as to allow movement of said inertial mass;

a case which holds said inertial mass, said ignition pin and said trigger lever such that said inertial mass, said ignition pin and said trigger lever are movable;

a bobbin which is provided so as to abut said case, said bobbin holding said inertial mass, said trigger lever and said safety device such that said inertial mass, said trigger lever and said safety device are movable; and a firing spring, one end portion of said firing spring abutting said bobbin, and another end portion of said firing spring abutting said ignition pin so that said firing spring urges said ignition pin in a direction of approaching the detonating member.

13. A mechanical ignition sensor according to claim 12, wherein said safety device has a shaft portion, a collar portion provided coaxially with said shaft portion, and a stopper which is formed so as to project from said collar portion, and said stopper is provided so as to be rotatable around an axial line of said shaft portion, and said stopper is movable from a position at which said stopper abuts an end surface of said inertial mass to a position at which said stopper can enter a concave portion formed in said inertial mass so as to enter a state of non-abutment with said inertial mass.

14. A mechanical ignition sensor according to claim 12, wherein said inertial mass has a slit and an inclined surface which opposes said slit, and when said inertial mass is moved, said slit is prevented from abutting said inclined surface and said trigger lever is movable within said slit.

15. A mechanical ignition sensor according to claim 12, wherein said trigger lever has an abutting portion, and when said trigger lever engages said ignition pin, said abutting portion abuts said inertial mass.

16. A mechanical ignition sensor according to claim 12, further comprising:

a bias spring which abuts the end surface of said inertial mass, said bias spring restricting movement of said inertial mass until the predetermined amount of load acts on said inertial mass.

17. A mechanical ignition sensor according to claim 12, further comprising:

a cap which is provided so as to contact respective outer circumferential surfaces of said case and said bobbin, said cap securing said bobbin to said case.

18. A mechanical ignition sensor according to claim 12, further comprising:

a safety device urging member which always urges said safety device in a direction of abutting said inertial mass.

19. A mechanical ignition sensor, comprising:

an ignition pin which moves in an axial direction of said ignition pin so as to ignite a detonating member;

an inertial mass which is formed in a cylindrical shape so as to be substantially coaxial with said ignition pin, a slit being provided at a portion of a circumferential surface of said inertial mass, and when a predetermined amount of load acts on said inertial mass, said inertial mass is moved by an inertial force;

a trigger lever which is provided between said ignition pin and said inertial mass, said trigger lever having a shaft portion at one end portion and an abutting portion at another end portion, said abutting portion being provided so as to be able to abut an inner circumferential surface of said inertial mass, and when said another end portion of said trigger lever engaging said ignition pin and said abutting portion abuts the inner circumferential surface of said inertial mass, said trigger lever holds said ignition pin at a position separated from the detonating member, and when said inertial mass is moved, said another end portion pivots around said shaft portion and moves into said slit, and accordingly, said trigger lever moves in a direction of separating from said ignition pin so as to allow movement of said ignition pin;

a safety device which is movable from a position at which said safety device abuts said inertial mass so as to prevent movement of said inertial mass, to a position at which said safety device and said inertial mass are in a state of non-abutment so as to allow movement of said inertial mass;

a case which has a bottom and is formed in a cylindrical shape so as to be substantially coaxial with said ignition pin, said case holding said inertial mass, said ignition pin and said trigger lever such that said inertial mass, said ignition pin and said trigger lever are movable;

a bobbin which is formed in a substantially columnar shape so as to be substantially coaxial with said case, said bobbin being provided so as to abut said case, said bobbin holding said inertial mass, said trigger lever and said safety device such that said inertial mass, said trigger lever and said safety device are movable;

a firing spring, one end portion of said firing spring contacting said bobbin, and another end portion of said firing spring abutting said ignition pin so that said firing spring urges said ignition pin in a direction of approaching the detonating member;

a bias spring, one end portion of said bias spring abutting said bobbin, and another end portion of said bias spring abutting an end surface of said inertial mass in an axial direction thereof, said bias spring restricting movement of said inertial mass until the predetermined amount of load acts on said inertial mass;

a coil spring which is provided between said safety device and said bobbin, said coil spring always urging said safety device in a direction of abutting said inertial mass; and a cap which is provided so as to contact respective outer circumferential surfaces of said case and said bobbin, said cap securing said bobbin to said case, wherein said inertial mass has an inclined surface which opposes said slit, and when said inertial mass is moved, said slit is prevented from abutting said inclined surface and said trigger lever is movable within said slit.

20. A mechanical ignition sensor according to claim 19, wherein said safety device has a shaft portion, a collar portion provided coaxially with said shaft portion, and a stopper which is formed so as to project from said collar portion, and said stopper is provided so as to be rotatable around an axial line of the shaft portion of said safety device, and said stopper is movable from a position at which said stopper abuts an end surface of said inertial mass to a position at which said stopper can enter a concave portion formed in said inertial mass so that said stopper enters a state of non-abutment with said inertial mass.

* * * * *